No. 749,670. PATENTED JAN. 12, 1904.
J. GARDNER.
BRACKET.
APPLICATION FILED DEC. 26, 1902.
NO MODEL.
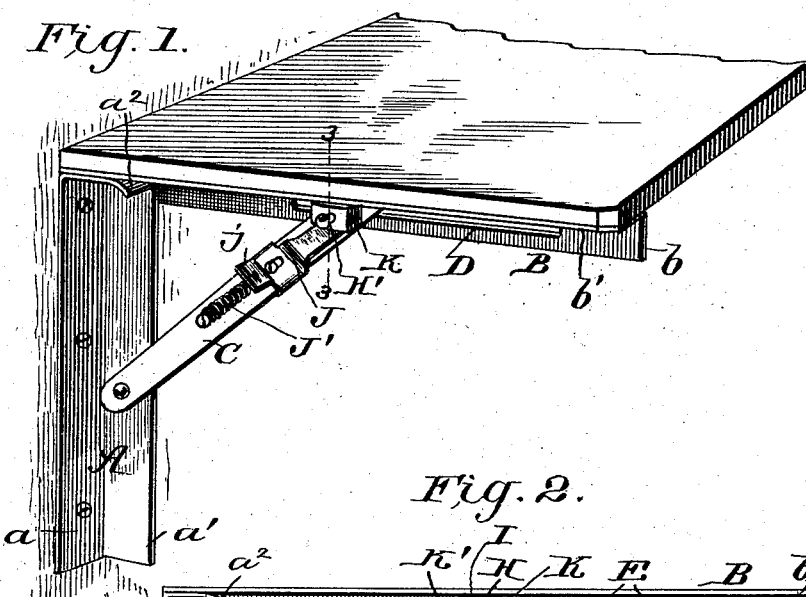
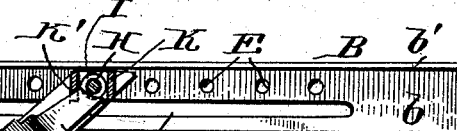
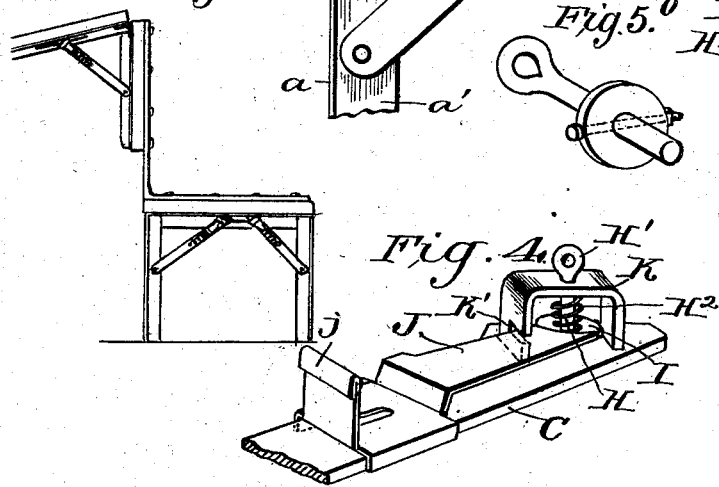
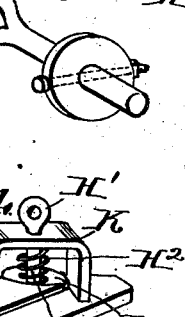
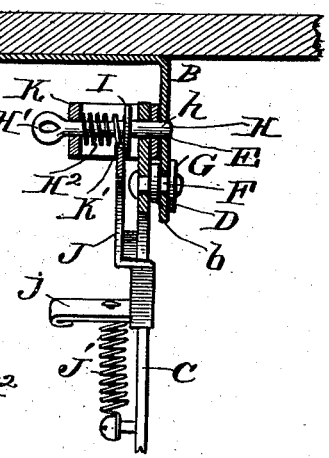
WITNESSES:
Jos. A. Ryan
Perry B. Turpin
INVENTOR
James Gardner
BY Munn & Co.
ATTORNEYS.

No. 749,670. Patented January 12, 1904.

UNITED STATES PATENT OFFICE.

JAMES GARDNER, OF LISMORE, NEW SOUTH WALES, AUSTRALIA.

BRACKET.

SPECIFICATION forming part of Letters Patent No. 749,670, dated January 12, 1904.

Application filed December 26, 1902. Serial No. 136,760. (No model.)

*To all whom it may concern:*

Be it known that I, JAMES GARDNER, a subject of the King of England, and a resident of Lismore, in the State of New South Wales, Australia, have made certain new and useful Improvements in Brackets, of which the following is a specification.

My invention is an improvement in locking angle-brackets for use on writing-desks in schools, warehouses, &c.; also, for shelves for displaying goods at any angle, for steps, trestles, folding wheelbarrow-legs, stools, and other locations wherein an adjustable bracket is desired; and the invention consists in certain novel constructions and combinations of parts, as will be hereinafter described and claimed.

In the drawings, Figure 1 is a perspective view of my improved bracket. Fig. 2 is a side view, part in section, of the bracket. Fig. 3 is a cross-section on about line 3 3 of Fig. 1. Fig. 4 is a detail perspective view of a portion of the brace with the locking-pin and keeper-plate, and Figs. 5 and 6 show somewhat different constructions.

My bracket, as shown, comprises the upright or main section A, the arm B, and the brace C. The main section A is formed with the wings $a$ and $a'$, the former being adapted to be screwed or nailed against a wall or other support and the wing $a'$ extending at a right angle to the wing $a$ and affording means for the connection of the arm B and the brace C. The upper end of the wing $a$ extends above that of the wing $a'$ and is preferably curved forward over the upper end of the said wing $a'$, as shown at $a^2$.

The arm B has the upright wing $b$, which is pivoted near its inner end to the wing $a'$ of the main section A, and the top wing $b'$, which stands at a right angle to the wing $b$ and forms a support for the shelf, desk-lid, or other object to be supported by the bracket.

The brace C is pivoted at one end to the wing $a'$ of the section A below the pivot of the arm B and is provided at its other end with means for engagement with the arm B and with locking devices by which it may be secured in any desired adjustment to the said arm in the use of the device. In the construction shown the wing $b$ of the arm B is provided with a longitudinal slot D and adjacent thereto with a series of perforations E, ranging longitudinally alongside the slot D, as shown. At its outer end the brace C is provided with a pin or stud F, which projects through the slot D, and with a head G, preferably in the form of a washer, as shown, which bears on the opposite side of the wing $b$ from the brace C and secures the brace in connection with the wing $b$, so the brace will be held to the said wing and the wing may slide along the brace as desired. The brace is provided adjacent to the pin or stud F with a locking pin or bolt H, having at its outer end a handle portion H' and arranged at its inner end at $h$ to protrude into the perforations E, which form a seat for the said locking-bolt, as will be understood from the drawings. The bolt H is actuated by a spring $H^2$, which normally sets it to engage with the seats E of the top arm of the bracket and is also provided with a projection I afforded by a washer on the said pin for engagement by the keeper-plate J, which is slidable along the brace into and out of position to engage above and below the projection I and is spring-actuated by a spring J' into position to engage above and below the projection I. When the keeper-plate is above the projection I, it locks the bolt H in one of the openings E, while when the said plate J is below the projection I it secures the said pin out of engagement with the openings E. In this connection the keeper-plate is preferably guided in a slot K' in a box K, secured to the arm and forming a housing for the bolt H and its actuating-spring.

In the operation of my invention the bracket may be conveniently secured to a suitable support by means of nails or screws driven through the wing $a$ of the section A and the shelf or other object to be supported be secured upon the top wing $b'$ of the arm B, the base being pivoted to the wing $a'$ of the section A and being slidably connected by its stud F, operating in the slot D of the wing $b$ of the arm B. If the keeper-plate J be now adjusted beneath the projection I of the bolt H, said bolt will be held out of engagement with the top arm of the bracket and the latter can be readily adjusted to any desired angle. When the desired angle is reached, the keeper-plate J may be moved by its handle j to release the projection I of the bolt H, and the latter will spring into the proper perforation E to secure the arm B at the desired angle, and on releasing the keeper-plate J after such adjustment of the locking pin or bolt H said pin will adjust above the projection I and will hold the locking-bolt in engagement with the arm B, thus locking the bracket in the desired adjustment.

Having thus described my invention, what I claim as new, and desire to secure by Letters Patent, is—

1. A bracket substantially as herein described comprising the main section having a wing for connection with the support, and a wing at a right angle thereto for connection with the top arm and brace, the top arm having an upright wing pivoted at its inner end to the wing of the main section and provided with a longitudinal slot and adjacent thereto with a series of perforations, said arm also having a top wing at a right angle to its slotted wing upon which may be secured the shelf or other object to be supported, the brace pivoted at its inner end to the main section and provided at its outer end with a headed stud operating in the slot of the arm, the spring-actuated locking-bolt carried by the brace and arranged to engage in the perforations of the top arm, said bolt being provided with a projection for engagement by the keeper-plate, and the spring-actuated keeper-plate sliding along the brace and engaging above and below the projection of the locking-bolt in the different adjustments of the device substantially as and for the purpose set forth.

2. A bracket comprising a main section, a top arm pivoted at its inner end to the main section and provided with the longitudinal slot and with a series of perforations adjacent thereto, and the brace pivoted at one end to the main section and provided at its other end with devices engaging in the slot of the arm and with locking devices engaging in the perforations of said arm substantially as set forth.

3. The combination in a bracket with the main section and the arm pivoted at its inner end to the main section, and provided with a series of perforations of the brace pivoted at one end to the main section and slidably engaged at its other end with the arm, the bolt carried by said brace and engaging in the perforations of the arm, and locking means whereby the bolt may be secured in or out of engagement with the perforations of the arm substantially as set forth.

4. A bracket comprising the upright or main section having wings at a right angle to each other providing the wing for connection with the support and the forwardly-projecting wing for connection with the arm and the brace, the arm and brace pivoted at their inner ends to said wing and slidably engaged with each other whereby the arm may be adjusted to different angles, the spring-actuated bolt carried by the brace for engagement with the arm for securing the brace and arm in different adjustments, and the keeper-plate for holding said bolt in different adjustments, substantially as set forth.

5. The combination with the top arm, of the brace therefor having a sliding engagement with the arm, the spring-actuated bolt carried by the brace for engagement with the top arm for securing the arm and brace in different adjustments, and the spring-actuated keeper-plate carried by the brace for securing the bolt in or out of engagement with the top arm, substantially as set forth.

6. The combination in a bracket with the top arm and the brace having a sliding engagement with said arm, of a locking-pin engaging with the arm for securing the brace and arm in different adjustments, and a keeper-plate by which to secure the locking-pin in locked and unlocked positions substantially as set forth.

7. A bracket comprising the top arm having a longitudinal slot and a series of openings adjacent thereto, the brace sliding along said arm and having a pin or projection entering the slot thereof, a bolt on the brace entering the openings in the top arm, and devices on the brace for holding said bolt out of position to engage said openings substantially as set forth.

JAMES GARDNER.

Witnesses:
  W. LOCKETT,
  C. A. BARHAM.